May 26, 1959
F. P. ZIERDEN
2,888,217
HOSE REEL
Filed July 27, 1954
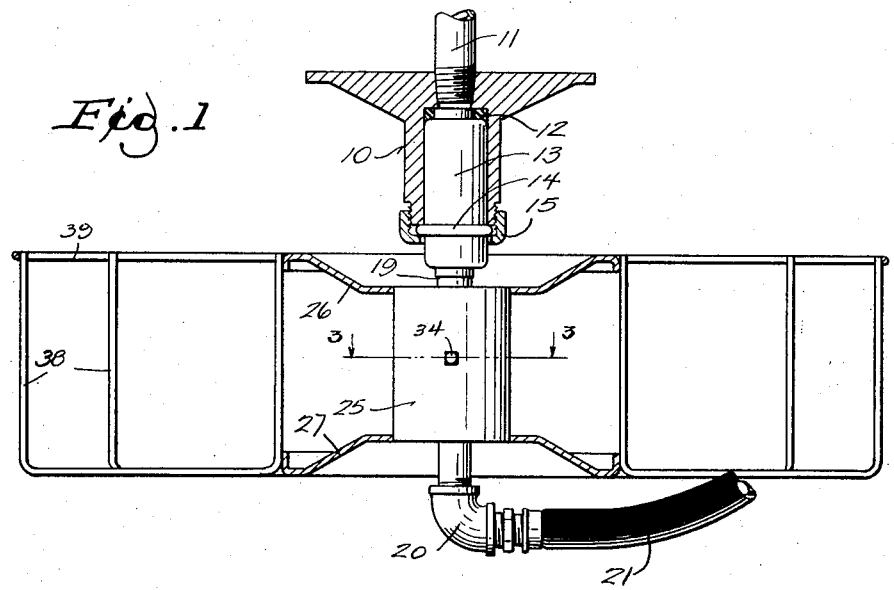
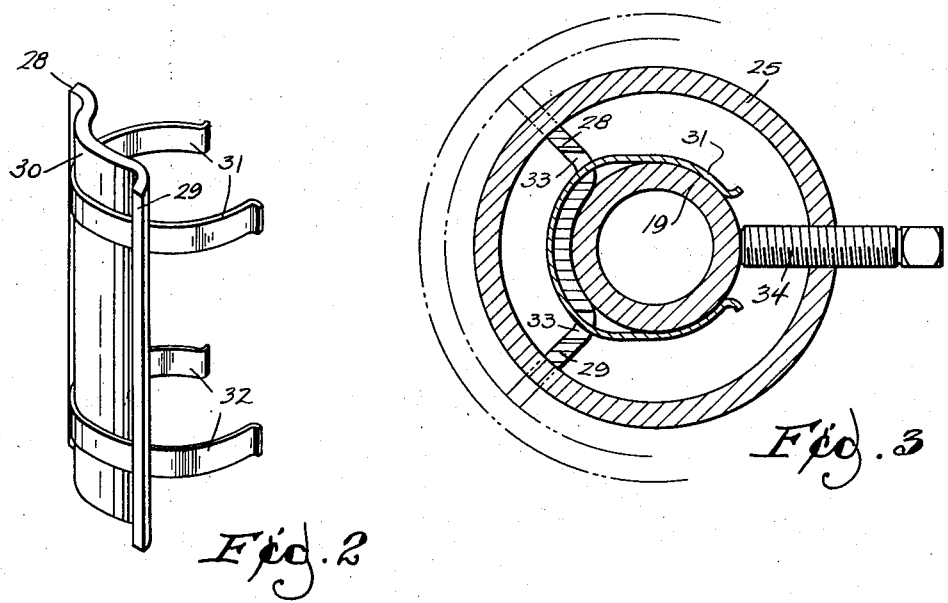
Inventor
FRANK P. ZIERDEN
By
Miles Henninger
Attorney

United States Patent Office 2,888,217
Patented May 26, 1959

2,888,217

HOSE REEL

Frank P. Zierden, Milwaukee, Wis.

Application July 27, 1954, Serial No. 446,020

2 Claims. (Cl. 242—86)

This invention relates to improvements in hose reels specially adapted to be permanently mounted for connection with a supply of fluid under pressure, and for connection of the hose therewith.

When a hose reel is to be permanently connected with a fluid pressure supply by way of a hollow spindle and in such manner that the hose may also be permanently connected and stored on the reel or put on and pulled off the reel for use, it is desirable to place the reel where it occupies otherwise unused space but is accessible for use of the hose at the desired location. Such unused space is frequently found only adjacent a ceiling or high on a wall of a building. Permanent mounting of the reel in such space is sometimes difficult and expensive and the stationary portion of the reel should remain fixed even though it becomes necessary to provide a hose container or hose-containing basket of different size. Such different size reel basket should accordingly be specially adapted for placement and removal with a minimum of tools and certainly without use of a welding torch or other dangerous operation.

Because of variations in the kinds of hose used by different persons with the same reel, and the varying "free coiling" characteristics of the hose, it is highly desirable to provide a construction in which a single size of spindle can support hose containers of different size. Thus a ¾" ID hose may have OD variations from 1" to over 2". The same capacity hose will therefore coil freely and without restraint only in loops of widely different size, the smaller OD hose coiling in a loop of smaller diameter. Resistance to coiling is just as important as packing friction in the amount of effort required in reeling up of the hose by pressing lengthwise thereon. It will be understood that the hose first coils on the outer wall of the hose container and thereafter forms coils successively inside of the preceding coil. Hence, the free coiling diameter of the hose determines the ID of the hose container.

It is therefore an object of the present invention to provide a hose reel mounting member and spindle for substantially permanent connection with a source in which any one of a number of hose container or basket hub sizes may be readily used with the same mounting member and spindle.

Another object of the invention is to provide a hose reel mounting and spindle in which the container or basket for receiving and storing the hose may be easily exchanged for accommodating a different diameter or length of hose and without in any way disturbing the relationships of the mounting member with the spindle bearings and packings.

Other objects and advantages will be apparent from the following disclosure.

In the drawings:

Fig. 1 is a side elevation of a hose reel embodying the present invention and with a portion thereof in vertical section to indicate the location of the mounting member for the rotatable spindle requiring packings and bearings for the spindle.

Fig. 2 is a perspective view of the member used in attaching any one of different sizes of hose containers on the same size spindle, and Fig. 3 is a horizontal section taken on the plane 3—3 of Fig. 1, to show the manner of attachment to the spindle, of the container or basket for retaining the hose.

Referring generally to the drawings, the present hose reel includes a supporting member adapted for attachment to the ceiling or wall of a building, brackets or a frame receiving a mounting member in stationary relation and which rotatably carries a spindle on which may be mounted any one of a number of different sized baskets for receiving and retaining a hose. Each basket comprises a hollow hub member receiving a seating member with an arcuate portion seating on the spindle and with a spring extending beyond the ends of the seat member for engaging the spindle. The hub seating member is pressed on the spindle by a screw threaded in the hub and bearing on the spindle opposite the seat member. A plurality of substantially U-shaped wires or rods are fixed to hub flanges and extend radially therefrom, the wires or rods being joined by circumferential wires or rods to define an annular space in which the hose is to be retained. The mounting member retains bearings of two kinds for the spindle and packings are combined with the bearings in such manner that a fluid-tight but easily rotatable joint is readily maintained between the mounting member and the spindle.

Referring specifically to the drawing by numbered parts, numeral 10 designates a supporting member by which the entire structure is to be mounted on a building ceiling or wall or other brackets or frame. The support member is hollow and is internally partially threaded for connection with a fluid supply pipe 11. The support provides a shoulder on which is seated a gasket 12 for sealing a mounting member 13 into the cavity in the support member. A flange 14 on the mounting member is engaged by a ring 15 threaded externally on the support member. The mounting member 13 may be partially internally threaded for connection with the fluid supply 11 under some circumstances. The mounting member 13, 14 for at least a portion of its length, is internally of a size to receive bearings and packings for a hollow rotatable spindle 19. One end of the spindle is planar to butt on or enter into the mounting member inlet, while the other spindle end is threaded to receive an elbow 20 to which a hose 21 is attached. In effect, the spindle is a tube of heavy wall thickness and a portion thereof extends from the mounting member and is cylindrical and of uniform outer diameter. Hence, a cylindrical surface is provided of a length on which hose containers or baskets of various widths may be mounted by a similar hub structure.

Each hub structure comprises a tube 25 to which are fixed flanges 26 and 27 adjacent the hub tube ends and extending outwardly from the tube. A somewhat channel-like member is placed inside the hub tube 25 and comprises two legs 28, 29 and an arcuate portion 30 bent on a radius from the center of the hub tube, equal to the radius of the outer surface of the spindle 19 for seating on such spindle. Leaf springs 31, 32 pass thru slots 33 around the hub seat member 28, 29, 30 and extend beyond two sides of the seat portion 30 thereof to embrace parts of the spindle outer surface. Such springs serve the purpose of retaining the hub basket in desired position until a screw 34 opposite seat member 28—30 is turned through the hub tube wall sufficiently to bear on the spindle 19 and to clamp the hub 25—33 thereon. By providing a number of hub tube sizes and a number of different size seat members, it is possible to use the same size mounting member and spindle for a large number of baskets to accommodate different lengths of different kinds and sizes of hose. The edges of the hub flanges are concentric and have attached thereto as by welding (not shown), a number of U-shaped wires or rods 38. One or more circumferential wires or rods 39 join the peripheral portions of the basket radial wires 38 to complete an annular basket around the mounting member and the spindle. The basket size is chosen to provide an internal diameter at least as much as the free coiling diameter of the hose.

It will be seen that the present device provides for easy substitution of any one of a number of hub and basket sizes to accommodate any desired length and size of hose and such substitution can be made in a very short time so that the mounting member and spindle are out of use only for a minimum of time. A single size of spindle will accommodate a number of different hose container sizes, which reduces the cost of making the reels to meet widely varying conditions. Hence, the reels are successfully used in many locations where the reel would otherwise be relatively inaccessible. As a result of such construction, the hose is always available but can be stored in otherwise unusable space.

I claim:

1. A hose reel mounting for quick attachment and detachment of the reel to a hollow spindle and comprising the hub tube, a hose container fixed on and encircling the hub tube, a rigid seating member secured within the hub tube and having an arcuate portion on a radius from the center of the hub tube equal to the radius of the outer surface of the spindle, resilient arcuate members attached to the rigid member, the rigid member and the resilient members embracing and seating on a portion of the spindle periphery for holding the hub tube and hose container co-axial with the spindle, and a screw threaded through the hub tube for engaging the spindle and pressing the seating member thereon whereby the hose container is held in fixed position on the spindle.

2. A hose reel mounting for quick attachment and detachment of the reel to a hollow spindle and comprising a hub tube extending around the spindle, a hose container fixed exteriorly on the hub tube, a seating member secured within the hub tube and having an arcuate portion engageable only with a portion of the spindle periphery for lateral application of the seating member to the spindle, the seating member having legs for engagement on the internal surface of the hub tube, and a screw threadedly extending through the wall of the hub tube opposite the seating member for engaging the spindle, removal of the screw releasing the seating member legs from the hub tube for movement of the hub tube laterally of the spindle.

References Cited in the file of this patent

UNITED STATES PATENTS

| | | |
|---|---|---|
| 750,277 | Hamilton | Jan. 26, 1904 |
| 1,128,069 | Sowers et al. | Feb. 9, 1915 |
| 1,717,846 | Johnston | June 18, 1929 |
| 2,220,610 | Miller | Nov. 5, 1940 |
| 2,238,535 | Meyer et al. | Apr. 15, 1941 |
| 2,299,521 | Zierden | Oct. 20, 1942 |
| 2,403,277 | Hall | July 2, 1946 |
| 2,414,997 | Atkins | Jan. 28, 1947 |
| 2,496,489 | Palm | Feb. 7, 1950 |
| 2,509,090 | Faccou | May 23, 1950 |
| 2,568,929 | Palm | Sept. 25, 1951 |
| 2,598,306 | Rostine | May 27, 1952 |
| 2,640,658 | Swanson | June 2, 1953 |